Oct. 7, 1958
T. B. WALTER
2,855,241
ROLLABLE SUN VISOR HAVING A PLURALITY
OF SEPARATELY MOVABLE SECTIONS
Filed Feb. 24, 1956
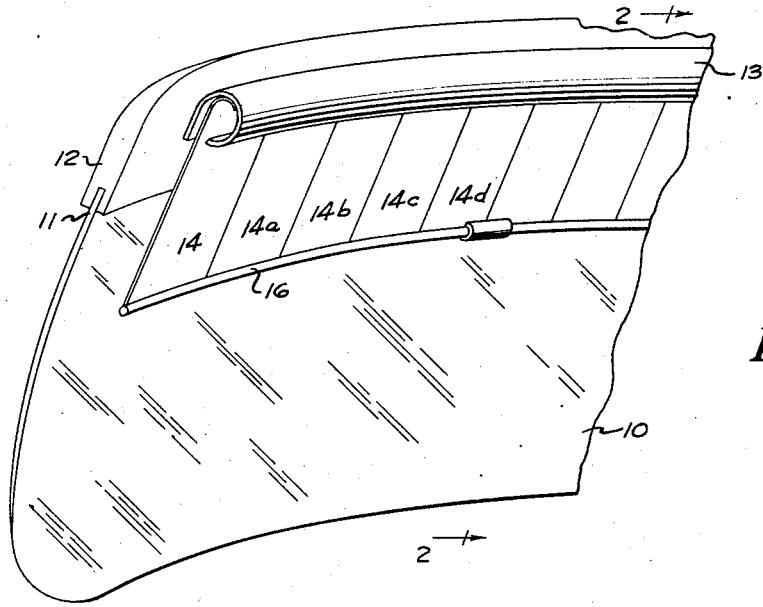
Fig 1
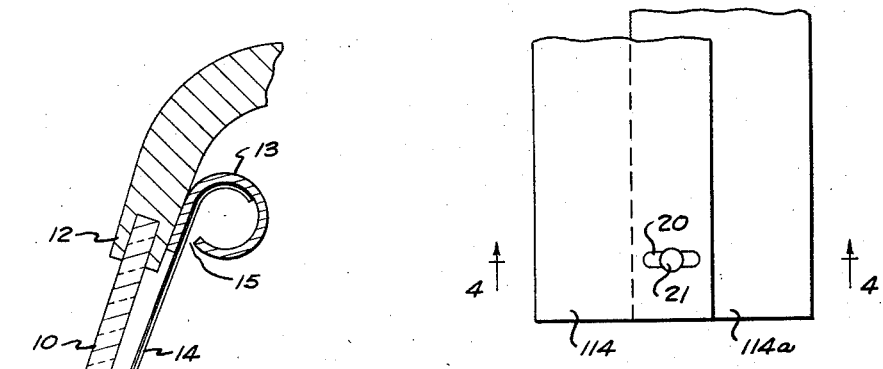
Fig 2
Fig 3
Fig 4
INVENTOR.
Theodore B Walter
BY
Clyde H Haynes
his atty United States Patent Office 2,855,241
Patented Oct. 7, 1958

2,855,241

ROLLABLE SUN VISOR HAVING A PLURALITY OF SEPARATELY MOVABLE SECTIONS

Theodore B. Walter, Oberlin, Ohio

Application February 24, 1956, Serial No. 567,638

2 Claims. (Cl. 296—97)

The present invention relates to sun visors and in particular to sun visors formed from coiled strips so that they can be rolled or unrolled across a window surface contour other than flat surface.

Modern automobiles and the like are being equipped with windows having a surface contour other than a flat surface. Single sheet types of sun visors which are rolled up out of the way and are unrolled across the window can not be used on these windows because they cannot follow the surface contour of the window. For example if the window is curved the single sheet type sun shade would have to be mounted on a curved roller to allow the shade to follow the contour of the window when it is unrolled.

Several attempts have been made to design curved rollers for single sheet type window shades wherein the rollers were made of many short parts axially knuckled together. However, the problem of getting the single sheet type of visor to work properly on the rollers is still apparent.

The present invention is directed to the elimination of these rollers by constructing a visor from a plurality of strips coiled in a housing. Each of the coiled strips has a normal shape defining a straight line longitudinally of the strip and an arcuate line transverse of the strip when it is not coiled in the housing.

In former single sheet types of visors it was necessary to unroll the entire width of the shade or sheet since the shade was a single piece of material rolled on a roller.

The present invention provides structure whereby any part of the window may be shaded without having to unroll the entire visor by constructing the visor from a plurality of independent and individual strips positioned in row like fashion across the window.

One of the objects of the present invention is to provide a sun visor which has a plurality of visor strips mounted in a single housing and each adapted to cover its respective specific area of a window.

Another object of the invention is to provide a visor for windows having a surface contour other than flat.

A further object of the invention is to provide a visor for a window wherein the visor is constructed from a housing alignable with the surface contour of the window and having an elongated opening therein and a plurality of coiled strips in the housing and extending through the opening wherein adjacent coiled strips may overlap each other, if desired, externally of the housing.

A still further object of the invention is to provide a visor constructed from a housing supporting a plurality of independent and individual coiled strips and a single handle operatively connected to all the strips to simultaneously coil and uncoil them.

Other objects will become apparent from a fuller understanding of the invention, which is exemplified in one of its structural forms in the following description and the accompanying drawings in which:

Fig. 1 represents a plan view of a window with a visor incorporating the present invention;

Fig. 2 is a cross sectional view along line 2—2 of Fig. 1,

Fig. 3 is a fragmentary plan view of a modification showing adjacent strips overlapping and loosely riveted together; and Fig. 4 is a view along line 4—4 of Fig. 3.

As illustrated in Fig. 1 the invention relates to a visor which can be used with windows having surface contours other than flat just as easily and effectively as it can be used with windows having a flat surface. In the figures the windshield 10 of an automobile is represented, however it is understood that any other similar window may be provided with the present visor and that even though the present visor was designed for curved windows it can also be used on straight windows. In order to bring out the features of the invention it will be described in connection with a curved window.

The windshield or window 10 has a surface contour other than a flat surface, and a curved upper edge 11 bounded by a molding strip 12. Mounted on this molding strip 12 is an elongated housing 13, supporting a plurality of visor strips 14, 14a, 14b, 14c, and 14d. The housing is aligned to the contour of the window 10 and has an elongated opening 15 also aligned with the contour of the window surface.

Each strip 14 is constructed from a metal, plastic or similar material which gives the strip certain internal physical and structural features. These internal features cause the strip to always tend to be in a normal position in which the strip extends in a straight line longitudinally of the strip and cause the strip to resist being coiled. The srip 14 has a normal shape defining a straight line longitudinally of the strip and a modified arc or arcuate line transverse of the strip when it is not coiled.

In Figures 1 and 2 one end of each of the strips 14 is shown coiled in the housing 13 and the other or external end of each strip is shown in normal position externally of the housing, the strip extending through the slot 15. The external ends of all the strips 14 to 14d may be loosely fitted in a single handle 16. All of the strips may be coiled into this housing simultaneously by this handle which may have a shape complementary to the window contour surface or to the housing 13. Because of the physical structure of the strips, they coil inside themselves as they are pushed into the housing 13, thus eliminating the need of a roller.

In the illustrations a handle is used for coiling and uncoiling the strip into and out of the housing. The handle is intended to include manual as well as power motivated structures, such as air or electric motors operatively connected to the strips. The handle or such other means as may be desired push or otherwise move the strips into the housing to coil them, and move the strips longitudinally out of the housing to uncoil them or put them in shading position relative to the window.

When handle 16 is removed each strip may be used independently of the other strips. Each strip covers its respective part of the total window surface area. Since the strips can be coiled or uncoiled independently, and each operates individually, they can cooperatively be used on windows of various shapes.

In Figures 3 and 4 there is illustrated a modification of the invention wherein the external end portions of adjacent strips overlap. In this modification strip 114 overlaps strip 114a. The strip can be maintained in this relative position by providing strip 114 with a slot 20 and strip 114a with a rivet or post 21 extending through slot 20. The post and slot arrangement maintains the strips in overlapping arrangement while permitting some relative movement therebetween. Figure 4 also shows the arcuate shape of the strip in direction transverse of the strip.

Although the visor has been described for use as a sun visor in association with a window, it is understood that it may also be used as a rain shield in association with a window or opening in a wall. The housing may be mounted above a window or opening so that the strips extend outwardly from the wall or window or at an angle thereto when they are uncoiled to form an awning type structure shielding the window or opening as well as when they are extended parallel to the window. The physical structure of the strips and their shape will hold them in extended position in either a horizontal or vertical direction when they are uncoiled out of the housing.

In all of these figures the strips operate and are used similarly. The visor includes a housing with at least a coiled strip therein, the coiled strip having a normal shape defining a straight line longitudinally of the strip and an arcuate line transverse of the strip when it is not coiled. A plurality of strips arranged in side-by-side or in overlapping fashion provide a visor or sun shade for a window, whether it have a planar or contour surface.

Various other modifications or arrangement of parts may be made besides the physical structure used herein to describe the invention without departing from the spirit and scope of the invention as set forth in the objects and the following claims.

What is claimed is:

1. A coilable visor adapted to be aligned complementary with and over a window having a curved surface contour comprising, a plurality of coilable elongated strips each being straight in its longitudinal direction and curved in its transverse direction when it is uncoiled, each of said strips having a coil end and a visor end, an elongated housing aligned with the contour of the window and having an elongated slot aligned with the contour of the window, said housing enclosingly supporting all of the coil ends when they are coiled in side to side relation in a curved row complementary with the contour of the window and with the visor ends extending through said slot, and curved handle means curved to the contour of the window and loosely joining said visor ends and positioning them relative to each other to summarily define a visor having a contour complementary to the contour of the window.

2. The structure of claim 1 including means permitting limited movement of said visor ends in a transverse direction into overlapping position and preventing movement of one strip relative to another in their longitudinal direction.

References Cited in the file of this patent

UNITED STATES PATENTS

| | | |
|---|---|---|
| 2,204,739 | Wells | June 18, 1940 |
| 2,289,644 | Gano, Jr. | July 14, 1942 |
| 2,345,106 | Erps | Mar. 28, 1944 |
| 2,547,373 | Camp | Apr. 3, 1951 |
| 2,572,257 | Gerner et al. | Oct. 23, 1951 |